US 6,724,386 B2

(12) United States Patent
Clavadetscher

(10) Patent No.: US 6,724,386 B2
(45) Date of Patent: Apr. 20, 2004

(54) SYSTEM AND PROCESS FOR GEOMETRY REPLACEMENT

(75) Inventor: Charles Clavadetscher, Culver City, CA (US)

(73) Assignees: Sony Corporation, Tokyo (JP); Sony Pictures Entertainment, Inc., Culver City, CA (US)

( * ) Notice: Subject to any disclaimer, the term of this patent is extended or adjusted under 35 U.S.C. 154(b) by 294 days.

(21) Appl. No.: 10/001,404

(22) Filed: Oct. 23, 2001

(65) Prior Publication Data

US 2003/0076321 A1 Apr. 24, 2003

(51) Int. Cl.[7] .............................................. G06T 15/00
(52) U.S. Cl. ....................................................... 345/427
(58) Field of Search ................................... 345/419, 421, 345/427, 428, 619, 629, 646

(56) References Cited

U.S. PATENT DOCUMENTS 4,805,121 A * 2/1989 Scott et al. ................. 345/421
6,636,216 B1 * 10/2003 Silverbrook et al. ........ 345/427

* cited by examiner

*Primary Examiner*—Phu K. Nguyen
(74) *Attorney, Agent, or Firm*—Foley & Lardner

(57) ABSTRACT

A system and process for replacing unwanted geometry (for example, tracking markers) in a recorded scene with new geometry. A 3-D matchmove process creates a 3-D map. The 3-D map is used to determine the 3-D coordinates of objects within the recorded scene. The 3-D coordinates of the tracking markers (and/or other objects) and the replacement portions are converted by a conversion means to 2D screen space coordinates of pixels that make up both the tracking markers (and/or other objects) and the replacement portions. A list comprising the 2D screen space pixel coordinates is then exported from the conversion means into a compositing application which reads the list of 2D pixel coordinates and makes the desired replacement automatically from frame-to-frame. Tracking markers (and/or other unwanted objects) are replaced with replacement portions with suitable characteristics.

20 Claims, 8 Drawing Sheets

START FRAME:

SIMPLE CAMERA TILT DOWN:

CAMERA ROTATES AROUND TABLE, THEN PULLS AWAY

SAME DESIRED SOURCE MARK LOCATIONS "+" AS TILT UP EXAMPLE:

FIG. 7A
FRAME 1
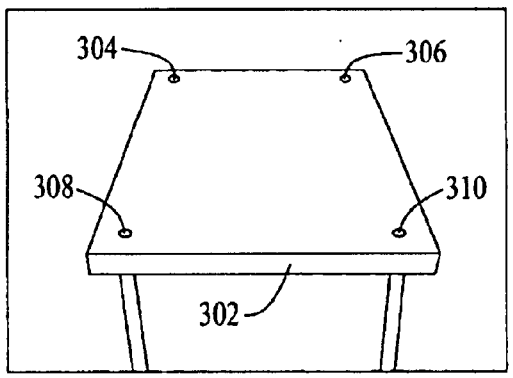
FIG. 7B
FRAME 33
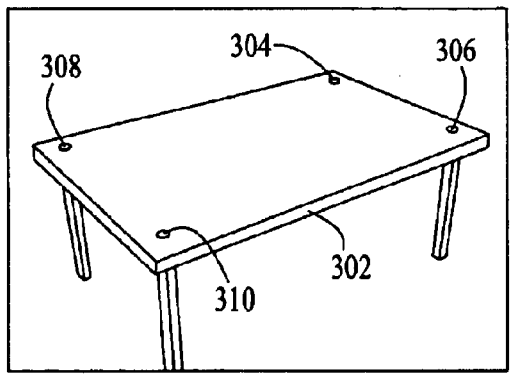
FRAME 66
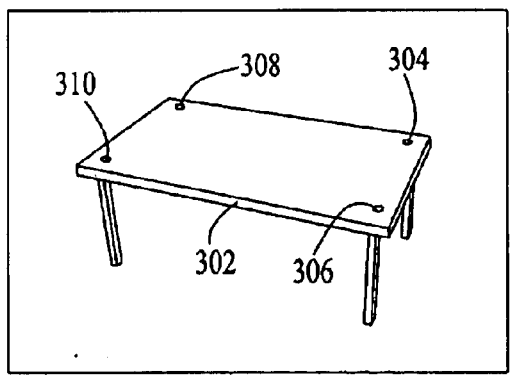
FRAME 99
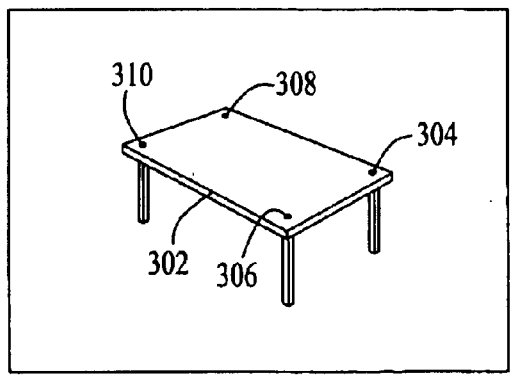
FIG. 7C
FIG. 7D

FRAME 1

FRAME 1 WITH NOTES

FRAME 33
SHOWING ORIGINAL RELATIONSHIP

FRAME 33
WITH CORRECTION NEEDED FROM FRAME 1

CLOSE UP: FRAME 66

CLOSE UP: FRAME 99

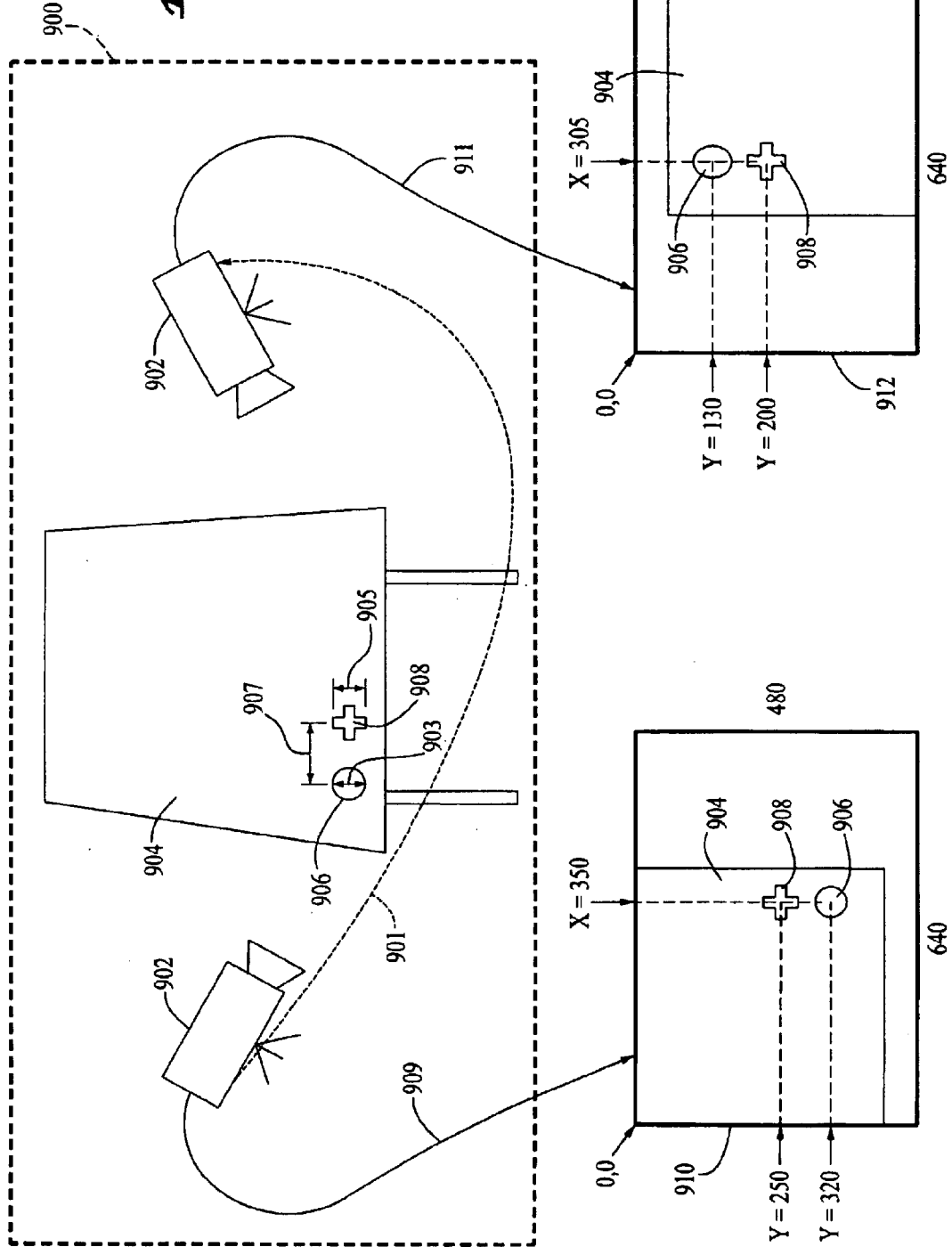

SYSTEM AND PROCESS FOR GEOMETRY REPLACEMENT

BACKGROUND OF THE INVENTION

1. Field of the Invention

The present invention relates generally to systems and processes for image editing and, more particularly, to a system and process for replacing unwanted geometry with new geometry utilized in a 3-dimensional ("3-D") tracking process.

2. Description of Related Art

Media productions have benefited in recent years from technical advances in animation and in computer generated images. Increasingly, producers and directors of media productions are creating scenes comprising a combination of real and computer generated images that appear to be interacting with each other and co-existing within the same real or virtual space. These new techniques can create realistic special effects such as computer generated dinosaurs or mice interacting with real people, or the destruction of recognizable cities by computer generated asteroids.

These new techniques are used in media productions such as motion pictures, television shows, television commercials, videos, multimedia CD-ROMs, web productions for the Internet/intranet, and the like. The process involves at least three general phases:

1) scene recording or production
2) camera and environment 3-D solving
3) compositing and other 2D image manipulation phases.

The first phase creates and captures the actual media images (i.e., live action footage, animation, computer graphics) used in the finished piece. Live action footage may be recorded, for example, in media formats such as film, videotape, and audiotape, or in the form of live media such as a broadcast video feed. The media information is captured through devices like cameras and microphones from the physical world of actual human actors, physical models and sets. Computer generated images (CGI), such as computer graphics, computer animation, and synthesized music and sounds, may be created by using computers and related electronic devices to synthetically model, generate and manipulate images and sounds, typically under the guidance and control of a human operator.

The next phase of 3-D solving re-creates the scene recorded in the first phase within the computer as a virtual 3-D environment and associated camera motion(s) and attributes. The identical recreation of the original scene within the computer allows computer graphic images to be generated (rendered) as if they were real objects shot by the original production camera. These rendered images can include computer graphic characters such as dinosaurs, a computer graphics mouse, computer graphics building, or whatever is required based upon the scene. Additionally, the rendering process can create additional elements and aspects of the basic computer graphics image such as shadows, reflections, and any other conceivable artifact that would have been present if the computer graphics character were actually a real object photographed in the original real, production environment.

The third phase uses compositing techniques which combine, integrate, and assemble these real (production) and computer generated (rendered) images, which may have been produced out of sequence and through various methods, into a coherent finished product, using operations such as editing, compositing and mixing. This process should result in real and computer generated images that appear to co-exist and interact as if they were captured or created at the same time, in the same space, from the same viewpoint. In post-production, the images are combined (or "composited") to generate believable results by adjusting the visual characteristics of the rendered object as well as its associated rendered artifacts (such as the shadows) to match the original production scene. These adjustments may include manipulating colors, brightness, gamma, size, the appearance of film grain to match the original image if it were shot on film, and many other visual attributes as appropriate for that particular scene and its medium. The compositing phase may also fix some or all errors, objectionable image aspects, and/or other visual problems introduced during independent and often very separate production steps.

Recording the original production scene sometimes requires special shooting conditions such as bluescreen photography, and/or the scene may require special or unusual sets, equipment, and foreign objects which may be present in the scene's original recording. However, some or all of the equipment, objects, and/or conditions are not intended to appear in the final product. Nevertheless, they may be necessary in order to produce the scene. As examples, they may be necessary for specialized or particular lighting requirements, safety concerns, proper execution of the final special effects, and other similar considerations.

One of the difficulties of combining and integrating computer graphics images into live action scenes occurs during the second step of 3-D solving. This phase attempts to solve and match all of the necessary three dimensional characteristics (such as positioning and movement) of the live action scenes. Even though the physical set of a live/recorded production is inherently 3-D, the recorded result is a 2-dimensional ("2-D") image from the camera's perspective. It is therefore very difficult to recreate and match the 3-D positioning and movement of the CGI to the recorded live action scene. Human visual acuity is sufficiently precise to detect anomalies in the relative scale, positioning, and dimensional relationship of the CGI to the live action scene. These relative characteristics must be accurately matched to obtain realism and present the viewer with a seamless view of the composite image.

Thus, it is advantageous to have a 3-D model of the live action scene to assist in integrating the CGI into the live action scene. One method for generating such a 3-D model is commonly referred to as 3-D tracking (also referred to in the present disclosure as "3-D matchmove" or "3-D solve").

To assist in the 3-D tracking process, several tracking markers or objects may be placed within the scene that is to be recorded even though they are considered foreign objects relative to the expected final image. These markers assist in determining the 3-D coordinates of the camera motion and other camera-related parameters, as well as creating a 3-D recreation of the objects in the scene and their 3-D spatial relationship to each other. Tracking markers can be sticker dots, tennis balls, painted lines, or other markers or objects that will be discernible in the recorded image of the scene. The tracking markers are usually placed on features within the scene and are specifically placed and designed to stand out in the recorded image and assist in the 2D tracking and 3-D solving process. In general, the more tracking markers there are within the scene, the more accurate will be the 3-D solve.

The scene is then recorded. The recorded scene is then scanned or similarly imported into a computer graphics program used for 2-D point or 2-D feature tracking (such as Combustion or Composer) or into a 3-D graphics scene recreation and solving application which includes 2-D point or 2-D feature tracking (such as 3D Equalizer or Matchmover). The tracking markers within the scene may then be tracked in 2-D screen space. A 3-D graphics application (such as 3D Equalizer or Matchmover) may then use tracking algorithms known in the art to mathematically convert (i.e., solve) the 2-D tracking information of the recorded scene into 3-D coordinates of the scene (a "3-D map").

Alternatively, human computer users can use their knowledge to manually try to solve the necessary recreation of the camera and the environment. Whether the information and 3-D map is gathered through a special application and solving algorithm or through manual means, this 3-D map of the original production scene in the computer's virtual space is used to assist in rendering the desired computer graphics images.

Once the 2D screen space motions have been converted, or solved, into a 3-D map, the 3-D map may be exported from the 3-D graphics solving application (or from the manual steps) to a 3-D animation software package (such as Maya, 3-D Studio Max, or Softimage). The 3-D map may be used within the animation software package to create and assist in rendering the computer graphics images which then appear as if they were present during the original production scene. By applying the final phase of post-production editing, compositing and mixing, these computer graphic images seamlessly integrate into the live action scene, for example, placing a computer generated mouse on a table along with its associated attributes such as shadows or reflections. Thus, the tracking markers assist in creating and integrating the desired realistic special effects.

However, once the scene is recorded, the presence of the tracking markers in the scene becomes a problem along with any and all other foreign objects as described above. Even if the scene is shot in a normal environment such as a room or outdoor location and there are no other objectionable objects such as lighting equipment, the tracking markers are a problem which must be corrected by removing them from the original image. This is because the tracking markers tend to stand out in the scene as odd and seemingly random objects that shift from one shot to the next. Therefore, to preserve the sought after realism, the tracking markers must be replaced in the scene in the post-production process by altering the image in some way.

There is one process which can eliminate the need for tracking markers in the original production photography and still potentially give the same benefits. This process uses specialized camera equipment which is driven by high precision motors which are controlled by a computer and special camera crew and computer operators. This technology is generally referred to as motion control, and it allows the camera to go through the exact same series of motions more than one time.

This allows a scene to be shot once normally with the actors present but without the tracking markers. The camera can then be reset and run through the same scene again (oftentimes referred to as a second pass or reference pass) without the actors but with the tracking markers present. Since the two scenes have exactly the same camera move, the 3-D solving software can use the second reference pass to perform the 3-D camera and environment solving. The resulting 3-D map can then be applied to the first scene with the actors. This process gives all the advantages of the markers or other specialized equipment, and also allows the scene with the actors to be used without any objectionable objects being present, thus eliminating the need to replace such objects.

Unfortunately, there are a number of problems and practical considerations which make the motion control solution undesirable, impractical, too expensive, or even impossible. Some of the factors which make the motion control pass solution unacceptable include: noise from the motors which can cause problems for sound recording; the need for much more expensive and complicated camera equipment and a specialized crew to run the equipment; the motors moving the camera have speed limits which can present problems compared to normally operated camera motions; the setup time and time to shoot the extra passes greatly impact the production schedule and further raises costs and concerns; and the equipment itself is not foolproof. Furthermore, if the passes are not absolutely identical, the second reference pass with the markers is useless and the special effects may therefore become enormously more complex without their presence to assist in the 3-D solve, thereby defeating any potential saving or other consideration gained through the use of motion control.

Because of these problems and the additional expense and complexity of motion control, the solution is considered too expensive and potentially faulty compared to the use of markers and other equipment which can be replaced through standard post-production special effects methods.

One such standard method for removing the tracking markers is to use 2-D tracking algorithms in combination with a digital painting or compositing application (such as Matador or Photoshop) to digitally replace the portion of the image with the tracking markers (the "target") with a replacement portion from a "source" which appears to be a part of the scene. For example, if a tracking marker dot is placed on a table within a scene to assist in a 3-D solve of the scene, the tracking marker dot needs to be replaced with a suitable and acceptable replacement portion which may be copied from a source that appears to be a part of the original table. The source replacement portion may then be pasted over the target tracking marker. This may result in a scene in which the tracking marker dot has been replaced with new image pixel data and the table appears normal.

Both the target and source may comprise a number of pixels within a given frame. The source of the replacement pixels can come from a portion of the same image, an image earlier or later in the sequence, from a separate scene, from special reference pictures, or any other suitable source. The most efficient and desirable process uses pixels from within the image itself. In order to replace the number of pixels that make up the target, a sufficient number of pixels within the frame must be chosen as the source. The source pixels must then be copied and pasted over the target pixels in order to replace them in the scene.

For example, in the table example discussed above, a portion of the table adjacent to the target may be chosen as a source. This is because the adjacent portion usually has similar characteristics (i.e., color, shading, textural appearance) and thus appears to be a part of the original image. Moreover, it is sometimes advantageous to determine more than one replacement portion to be associated with a particular tracking marker dot. This is because one may be a better replacement portion than the other depending on such factors as lighting, shadows, and distinctness (for ease of tracking) from frame-to-frame. Thus, a particular tracking marker dot may be replaced by either one or several replacement portions associated with that tracking marker dot.

If the camera move (i.e., the motion of the camera as the scene is recorded) is relatively simple, a tracking marker replacement process may also be relatively simple, because the relationship between the tracking markers and the replacement portions, as well as the size of each, may stay relatively constant from frame-to-frame. Thus, in the case of a simple camera move, the replacement process may be aided to some degree by a 2-D tracking program known in the art which may automatically track the tracking markers from frame-to-frame. Once the relationship between the tracking markers and the replacement portions is determined from one frame, this information is provided as an input to the 2-D tracking program. The program may then use this information to automate the replacement process in subsequent frames of the scene requiring marker replacement.

However, even when using a 2-D tracking program there may still be a considerable number of manual steps involved in order to overlay (i.e.,replace) the original tracking marker dots in a satisfactory manner. This may result from slight frame-to-frame variations in the relationship between the tracking markers and the replacement portions. These variations may result in portions of the tracking markers not being fully overlaid by the replacement portions.

Furthermore, it is usually important that the characteristics of the replacement portions used to overlay a particular tracking marker be consistent from frame-to-frame. If they are not consistent, negative effects such as flicker, inconsistent color change, or wobble may occur in that portion of the scene where the tracking marker was overlaid. Such effects may be discernible by a viewer and are usually unacceptable. Commonly, it is difficult to perform 2-D tracking on the source because the source may not stand out in the scene in the same manner as the tracking marker dot or marker whose characteristics are specially designed to make tracking easy and accurate. "For example, a tennis ball as a tracking marker on a large grassy field is easy to track exactly because of the distinct differences in geometry and color. However trying to track any specific patch of grass alone is extremely difficult since one area will look virtually the same as another as a scene progresses. The high precision tracking necessary for realistic computer graphics effects may become extraordinarily difficult or nearly impossible in this or similar types of situations. This is because accurate tracking requires discernible differences to distinguish one area from another, and either human or computer-assisted tracking will have great difficulty in tracking one specific grassy area because of the lack of trackable differences in the grassy field." Thus, it is often difficult to accurately and efficiently track the source and maintain this consistency when employing a 2-D tracking program because unlike in the case of the tracking marker there is usually no consistent frame-to-frame tracking point which the 2-D tracking program can utilize to track the replacement portions.

The replacement process may be further complicated in several ways. For example, if the tracking markers are placed on a moving object within the scene, for example a tumbling automobile, the replacement process becomes much more complex. This is because the larger motions and changes in perspective due to the tumbling motion result in a constantly changing relationship between the sources and the targets from frame-to-frame.

Furthermore, the process is more complicated when the camera move is not a simple one. More complex camera moves in relation to the recorded object may result in changes in the 2-D spatial relationship of the sources to the targets from frame-to-frame, as well as possibly changing the size of the sources and targets. Also, additional complexity may be introduced if the object is moving at the same time that the camera is moving. Many camera moves introduce the same problem as described above for a tumbling object, i.e., the 2-D spatial relationship between the target and the source, as well as the size of both, changes from frame-to-frame. This makes consistent copying of the source pixels over the target pixels very difficult in a automated 2-D tracking process.

Therefore, when it is difficult to automatically perform a consistent replacement using the 2-D tracking software, manual copy and paste procedures may be necessary in order to overlay the original tracking marker dots in a satisfactory manner. Software tools within a compositing application may be used to manually copy and paste replacement portions containing suitable imagery over the tracking marker dots on a frame-by-frame basis. Because "painting" is the process of manually adjusting or replacing individual pixels within individual frames, this process involves manual work on each of the affected frames of the scene at the level of individual pixels.

Therefore, with the current state of the art, a filmmaker must balance the desirability of placing larger numbers of tracking markers within a scene in order to achieve a more accurate 3-D model against the difficulties involved in removing the tracking markers once the scene is recorded. The filmmaker often decides to limit the number of tracking markers in order to simplify the post-production process. As a result, the CGI artist must work with a less accurate 3-D model.

Although the previous example focused on tracking markers, as mentioned earlier, special effects scenes oftentimes contain many foreign objects, such as stage rigging, safety equipment, incomplete buildings, and other portions of the scene which are undesirable, and which must be replaced through some technique. Previously these techniques generally followed the standard painting and replacing techniques described above. The process described above to replace tracking markers is also applicable to many of the replacement needs for other types of geometry and objects undesirable in the final scene.

Thus, there is an industry demand for an accelerated and simplified post-production process for removing unwanted geometry and objects from recorded scenes. In that regard, there is an industry need for a system and process for automatically and accurately replacing unwanted geometry and objects with replacement portions in scenes where the 2-D spatial relationship between the unwanted geometry and objects and the replacement portions, as well as the size of each, do not remain constant from frame-to-frame.

SUMMARY OF THE DISCLOSURE

Therefore, embodiments of the present invention provide a system and process for accelerating and simplifying the post-production process for replacing unwanted geometry and objects (including tracking markers) from recorded scenes.

Embodiments of the present invention further provide a system and process for automatically and accurately replacing unwanted geometry and objects (including tracking markers) with replacement portions in scenes where the 2-D spatial relationship between the tracking markers and the replacement portions, as well as the size of each, do not remain constant from frame-to-frame.

In one embodiment, a 3-D map of a recorded scene is generated during a 3-D matchmove process. A software application may then be used to derive 2-D screen defined space pixel locations from the 3-D map. The derived screen defined space pixel locations may then be input into a 2-D compositing application, where the 2-D pixel locations may be used to perform automatic, accurate, and consistent replacement of unwanted geometry and objects (including tracking markers) with replacement portions, despite complex camera/object moves within the recorded scene.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

Referring now to the drawings in which like reference numbers represent corresponding parts throughout:

FIGS. 7a–7d illustrate frames during a more complex camera move (such as that illustrated in FIG. 6) in relation to an object by showing four frames selected from a number of frames at intervals of 32 frames;

FIG. 9 illustrates the relationship between 3-D coordinates and 2-D screen space by showing tracking markers and replacement portions within a scene being recorded by a camera, as well as within two sequential frames from the recorded scene as viewed through a camera viewfinder.

DETAILED DESCRIPTION OF EMBODIMENTS OF THE INVENTION

Figure 1:
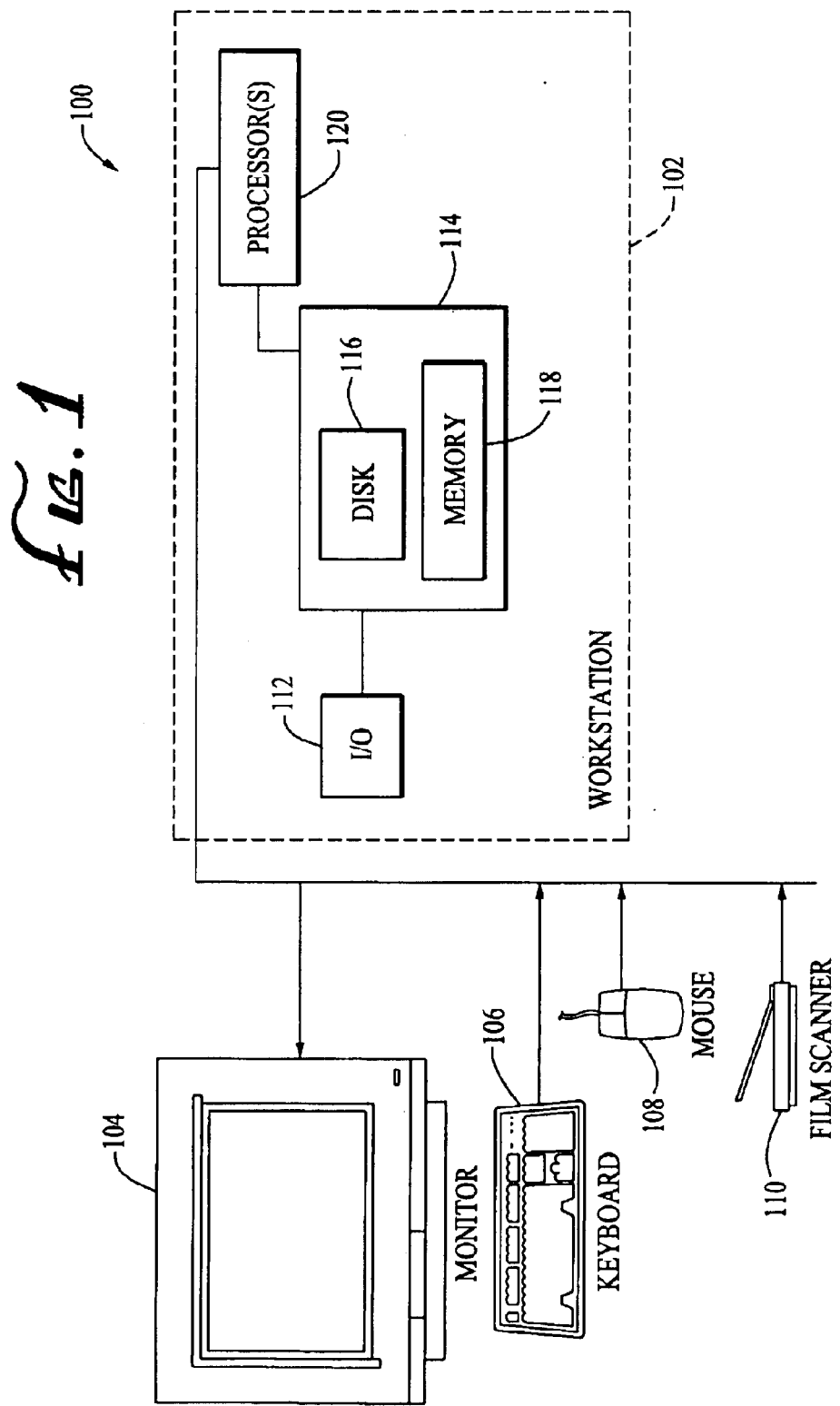
FIG. 1 shows an exemplary hardware/software environment in which a system and process according to embodiments of the invention may be employed.

In the following description of embodiments of the invention, reference is made to the accompanying drawings which form a part hereof, and in which is shown by way of illustration specific embodiments in which the invention may be practiced. It is to be understood that other embodiments may be utilized and structural changes may be made without departing from the scope of embodiments of the present invention.

As discussed above, the present invention relates generally to a system and process for removing unwanted geometry and objects (including tracking markers) from a recorded scene. Embodiments of the invention may be employed in various applications, including, but not limited to, television special effects, video game development, educational applications, interactive applications, and computer aided design applications (for example, architectural design). In one embodiment, a system and process for replacing unwanted geometry and objects (including tracking markers) is configured for a film industry visual effects environment. However, other embodiments may be employed in other video or computer graphics environments.

Embodiments of the present invention address the need for an automated system and process for replacing unwanted geometry and objects (including tracking markers) that significantly reduces the number of manual steps involved and results in a more consistent appearance of the replacement area. A system and process according to embodiments of the invention advantageously utilize the 3-D map of a recorded scene generated from a 3-D matchmove process to automate a replacement process for replacing unwanted geometry and objects (including tracking markers).

As described above, in some standard 3-D matchmove processes, tracking markers may be placed on objects within a scene to assist in the creation of a 3-D map of the scene. Other foreign geometry and objects may also be present. After the scene is recorded, a 2-D image of the recorded scene may be imported, for example by scanning, into a graphics application. The tracking markers within the scene may then be tracked in 2-D screen space. A tracking engine within the application may then use standard tracking algorithms to mathematically convert 2-D tracking information of the recorded scene into a 3-D map of the scene. Once the conversion is completed, this 3-D map may be exported from the 3-D graphics application to a 3-D animation software package for animating and rendering computer graphics images. These images are then sent to post-production for editing, compositing and mixing with the original live action scene.

In addition to using a 3-D map as an aid to the post-production process of seamlessly integrating CGI into the live action scene, a system and process according to embodiments of the invention also advantageously utilize a 3-D map to automate a process to replace unwanted geometry and objects (including tracking markers). This automation may be achieved by deriving the required 2-D coordinates and size of the targets and sources, as well as the 2-D distance between the targets and sources, from a 3-D map of the recorded scene. The 2-D coordinates of the pixels that make up both the targets and the sources may be derived from a 3-D map by a conversion means. The 2-D pixel coordinates may then be exported from the conversion means into a compositing application which reads 2-D pixel coordinates of the targets and sources and may make the desired replacements automatically from frame-to-frame.

Thus, a system and process according to embodiments of the invention may advantageously utilize a 3-D map to determine target and source positions and sizes in the independent, 3-D virtual space of the 3-D map. These 3-D target and source positions and sizes are fixed in 3-D space and therefore do not change regardless of camera or object motion. Thus, these positions and sizes chosen in 3-D space may be used from frame-to-frame to derive 2-D position and size of the targets and sources in each frame even though the 2D pixel coordinates and overall size may be changing on a frame-by-frame basis due to camera motion, object motion, or a combination of both. Using derived 2-D information, a compositing application may then perform the replacement process more automatically and accurately.

System Hardware Environment

A system and process for removing tracking markers from a recorded scene, according to embodiments of the present invention, may be used with various types of hardware/software combinations. FIG. 1 illustrates an exemplary hardware/software environment wherein, according to one embodiment, the system and process of the present invention may be employed.

The system 100 may include a computer workstation 102, a computer monitor 104, and input devices such as a keyboard 106, mouse 108, and film scanner 110. The workstation 102 may also include input/output interfaces 112, storage 114, such as a disk 116 and random access memory (RAM) 118, as well as one or more processors 120. The workstation 102 may be a computer graphics workstation such as the IRIX workstation sold by Silicon Graphics, Inc., a Windows NT-type workstation or other suitable computer or computers. The computer monitor 104, keyboard 106, mouse 108, film scanner 110, as well as other input devices such as, but not limited to, video tape recorders, cameras, and hardware accelerators (not shown) may be used to interact with various software elements of the system residing in the memory of the workstation 102 to cause media editing, compositing and mixing processes to be performed on media. The system 100 in FIG. 1 is shown by way of illustration and not limitation. Other systems may be used to implement embodiments of the invention for geometry tracking and replacement.

System and device functions and processes described herein may be implemented with machine-executable instructions. Software comprising these instructions may be used to program and cause general-purpose or special-purpose processors to perform the functions and processes described herein. Alternatively, such functions and processes may be implemented by firmware, hardware comprising hardwired logic, or by any combination thereof.

Process For Removing Unwanted Geometry And Objects (Including Tracking Markers)

Figure 2:
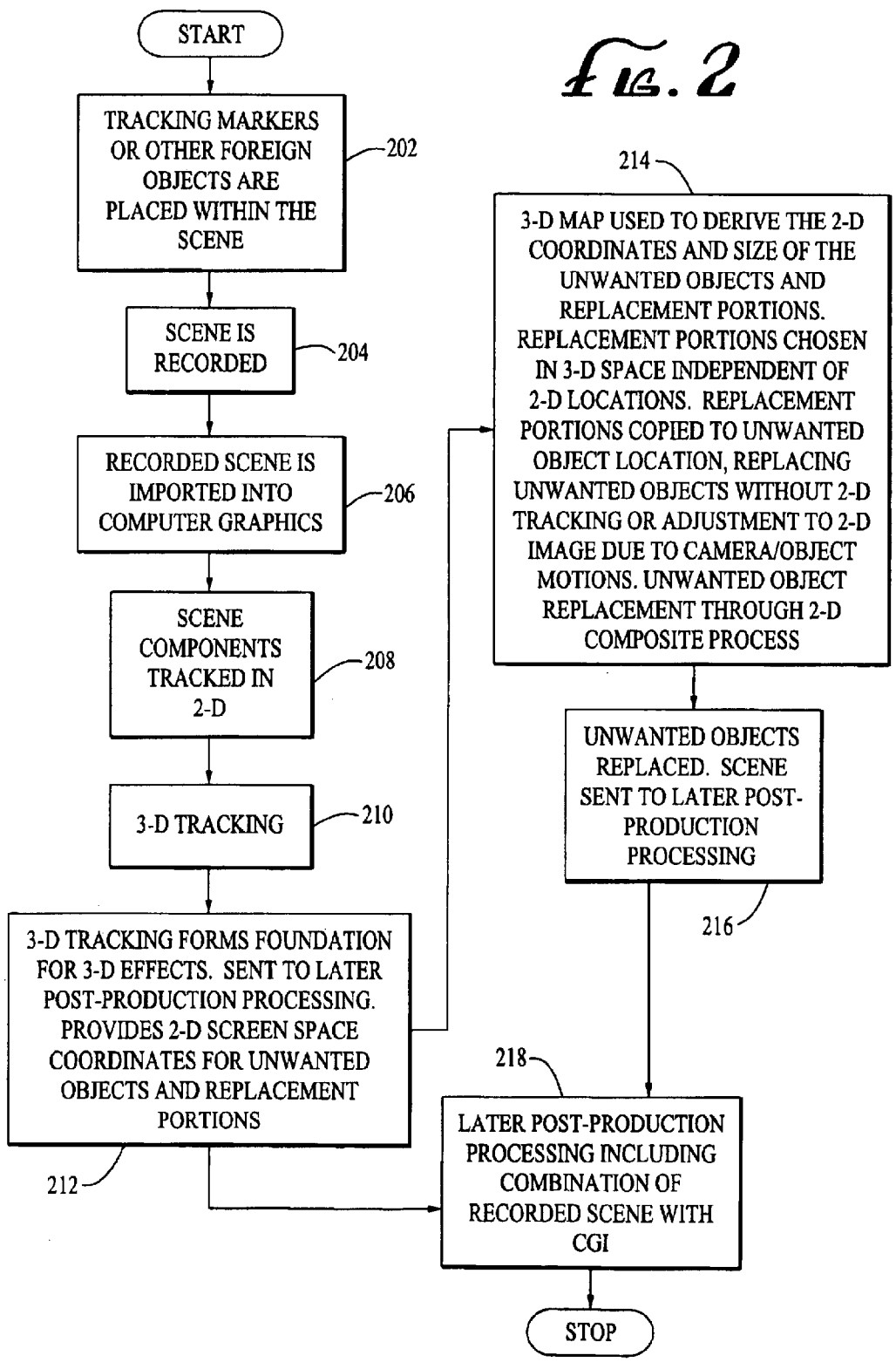
FIG. 2 shows a flowchart of a process for generating a 3-D model of a live action scene according to embodiments of the invention.

FIG. 2 shows a flowchart of a process for generating a 3-D model of a live action scene according to an embodiment of the invention for removing tracking markers from a recorded scene. As shown in step 202, a 3-D model generation process may begin with the placement of several tracking markers or objects within the scene to be recorded. These tracking markers or objects assist in determining the 3-D coordinates of the camera motion and other camera-related parameters, as well as a 3-D recreation of the objects in the scene and their 3-D spatial relationship to each other. Other foreign objects may also be present.

Figure 3:
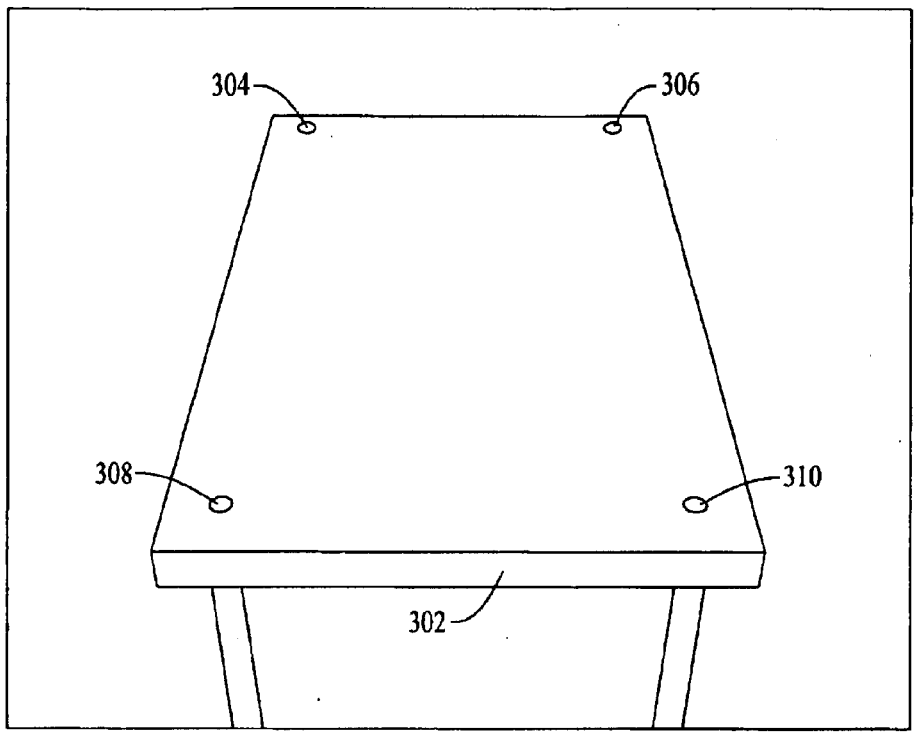
FIG. 3 shows a single frame of a recorded scene as viewed through a camera viewfinder, illustrating the placement of tracking markers on an object within the scene, according to an embodiment of the invention.

For example, as shown in FIG. 3, tracking markers 304, 306, 308, and 310 may be placed on a table 302, which is an object in a scene to be recorded. The scene may then be recorded, as shown in step 204 in FIG. 2. FIG. 3 shows a single frame of the recorded scene as it might be seen, for example, on a camera viewfinder. As shown in step 206, the recorded scene may then be imported (for example, by scanner 110 in FIG. 1) into a computer system for executing applications which may reside on disk 116 and may be loaded into RAM memory 118 and run by processor 120 in workstation 102. The tracking markers and/or other scene components within the scene may then be tracked on a frame-by-frame basis in 2D screen space, as shown in step 208.

A tracking engine within a 3-D graphics application may then use tracking algorithms to mathematically convert the frame by frame 2-D tracking information of the recorded scene into a 3-D map, as shown in step 210. As an alternative to computer-assisted 2D and 3-D tracking and solving, human manual methods and/or humans using 2D and/or 3-D graphics software may also produce 2-D and/or 3-D tracking and an accurate 3-D map. Once the 3-D conversion is completed, a 3-D map may be exported from the 3-D graphics application to a 3-D animation software package (which may also reside on disk 116 and may also be loaded into RAM memory 118 and run by processor 120). There, the 3-D map may form, during post-production processing (step 218), the foundation for 3-D visual effects, animation, rendering, as well as other post-production editing, compositing and mixing, as shown in step 212.

As discussed above, after using the tracking markers to assist in the creation of the 3-D map, it is usually desirable to replace the tracking markers in the recorded scene along with any other unwanted foreign objects or geometry. As described above, using standard replacement processes, if the camera move is a simple one, the replacement process may also be simple. A simple camera move is illustrated in FIG. 4.

Figure 4:
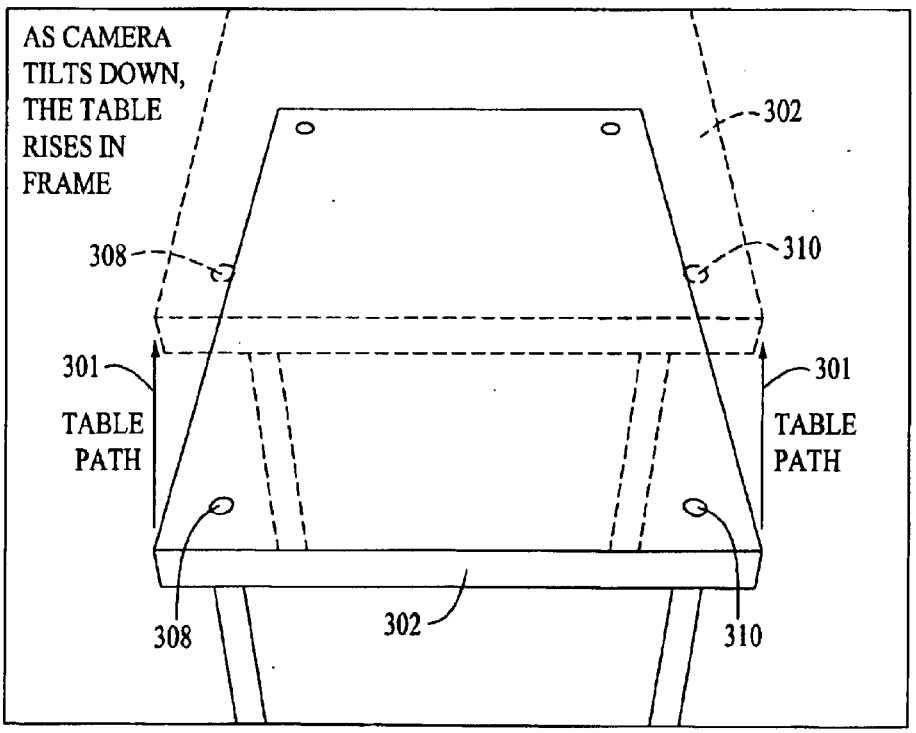
FIG. 4 illustrates the relation between a simple camera move and the location of tracking markers by showing sequential first and last frames from a recorded scene, as viewed through a camera viewfinder, superimposed one over the other.

FIG. 4 shows a composite frame. The composite frame has been created by superimposing a first and last frame from the recorded scene, as viewed, for example, by the camera viewfinder, over each other. The first frame shows table 302 before a simple camera move and the last frame shows table 302 after the simple camera move. As can be seen from FIG. 4, tracking marker dots 308 and 310 change position in 2-D screen space from the first frame to the last frame as the camera tilts down. This 2-D change of position of table 302 from the first frame to the last frame is represented by directed lines 301.

Figure 5:
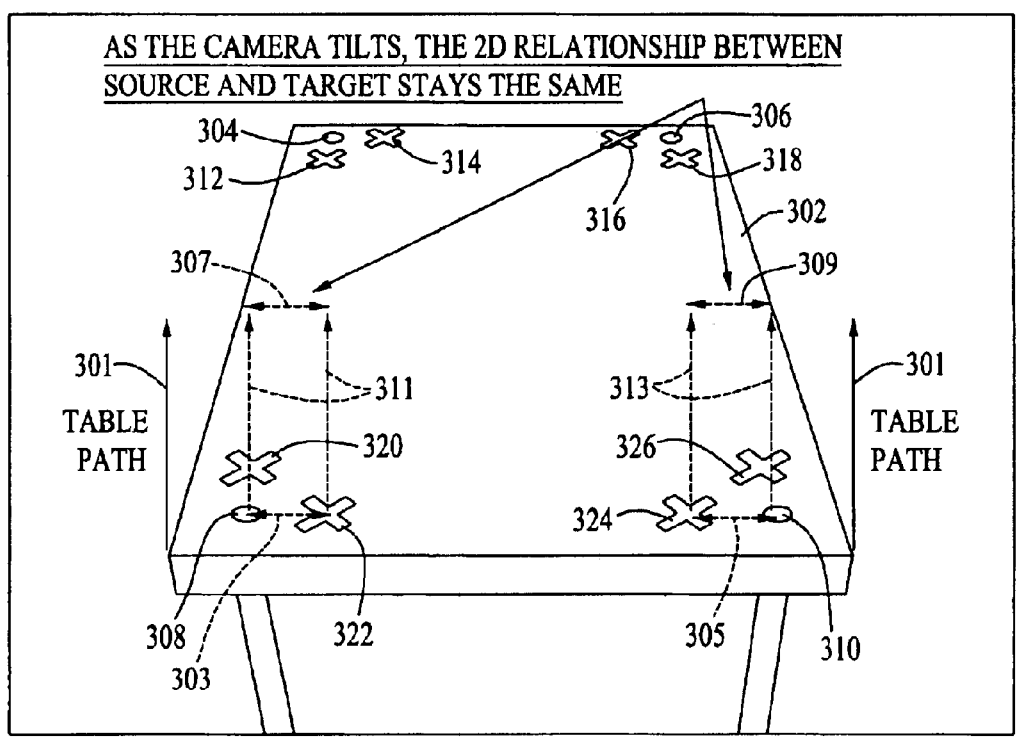
FIG. 5 shows an example of tracking markers and their associated replacement portions located on an object in the scene as viewed through a camera viewfinder, according to an embodiment of the invention.

FIG. 5 shows an example of tracking markers and their associated replacement portions, as viewed, for example, by the camera viewfinder. Only the first frame (pre-camera move) from FIG. 4 is shown in FIG. 5, without the superimposition of the last post-camera move frame. Replacement portions 312, 314, 316, 318, 320, 322, 324, and 326 (all marked by a +) are chosen adjacent to tracking marker dots 304, 306, 308, and 310, respectively. The + symbol is chosen to represent the replacement image source area only as an aid to visualize the process and to differentiate the round tracking dots from the portions of the table which will be used as the source imagery to replace the portion of the table with the dots.

Note that the + symbols do not appear in the original recorded scene (as shown in FIG. 3 and FIG. 4) and a + symbol is used in the figures to assist in recognizing changes in direction, size, and orientation from the recorded image point of view. The + also emphasizes the need for an exact and unchanging tracked location for the replacement image source pixels which will later replace the tracking dot. However the + does not indicate the actual shape or size of the replacement image source. This will be chosen by the user and could be a rectangular area, a circle, oval, or any other shape deemed appropriate by the user. Thus, the + indicates the fixed and unchanging basis for the tracked position of the replacement image source, but does not indicate the actual section or boundary of area to be used in the replacement process.

Each tracking marker dot is associated with a particular pair of replacement portions. Thus, tracking marker dot 304 is associated with replacement portions 312 and 314. Similarly, tracking marker dot 306 is associated with replacement portions 316 and 318; tracking marker dot 308 is associated with replacement portions 320 and 322; and tracking marker dot 310 is associated with replacement portions 324 and 326. For the reasons stated above, more than one replacement portion may be determined to be associated with a particular tracking marker dot. Thus, a particular tracking marker dot may be replaced by either one of the pair of replacement portions associated with that tracking marker dot or a composite mix of the two in order to make an appropriate replacement image.

FIG. 5 shows the effect of the simple camera movement shown in FIG. 4 on the relationship between tracking marker dots 308 and 310 and respective associated replacement portions 322 and 324. Dimension 303 is the pre-movement distance between tracking marker dot 308 and replacement portion 322. Dimension 305 is the pre-movement distance between tracking marker dot 310 and replacement portion 324.

As the camera moves in relation to table 302 (represented by directed lines 301), the 2-D on-screen location of tracking marker dots 308 and 310 and respective associated replacement portions 322 and 324 changes. However, as the 2-D spatial positions of tracking marker dots 308 and 310 and respective associated replacement portions 322 and 324 change from frame-to-frame (represented by directed lines 311 and 313, respectively), the distance between tracking marker dot 308 and replacement portion 322 (post-movement dimension 307), as well as the distance between tracking marker dot 310 and replacement portion 324 (post-movement dimension 309), remain essentially constant after the simple camera move. Moreover, the size of tracking marker dots 308 and 310, as well as the size of replacement portions 322 and 324, also remain essentially constant. Therefore, in the recorded scene of this simple camera move, the tracking marker may be tracked in 2-D from frame-to-frame during the camera movement and the constant relationship between the tracking marker and its associated replacement portion facilitates the automation of the replacement process to a certain extent, as discussed above.

Figure 6:
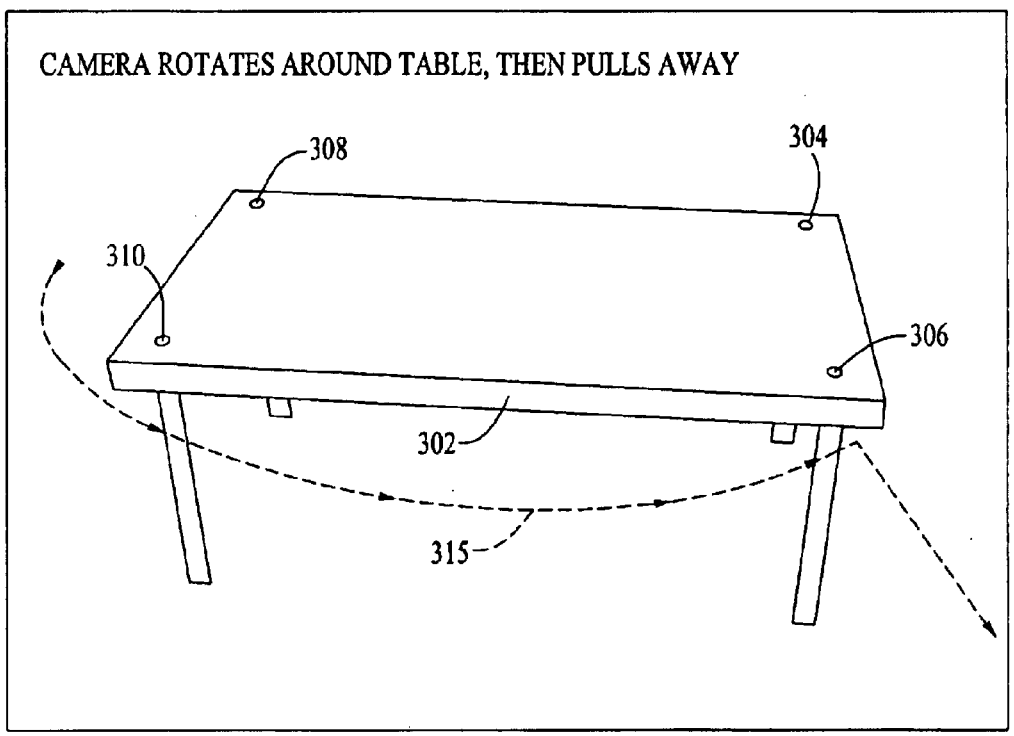
FIG. 6 illustrates a more complex camera move problem.
Figure 8A:
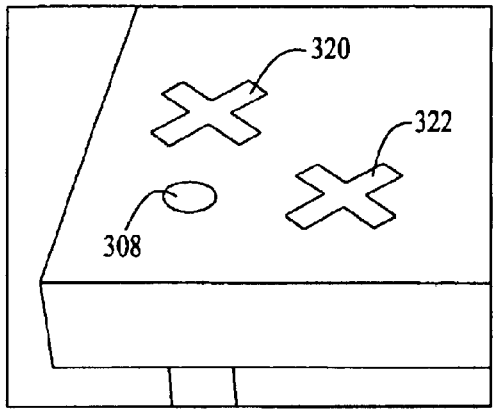
FIGS. 8a–8d illustrate frames during a more complex camera move in relation to tracking markers and replacement portions located on an object by showing close-ups of the object as the camera move progresses.
Figure 8B:
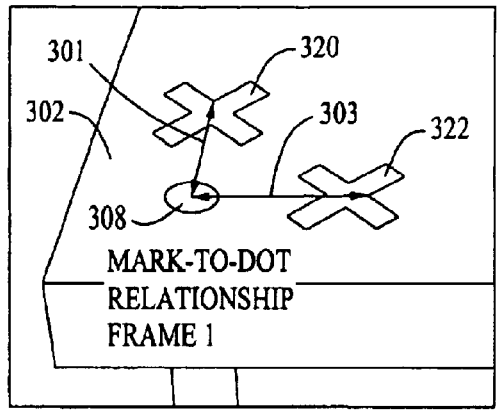
Figure 8C:
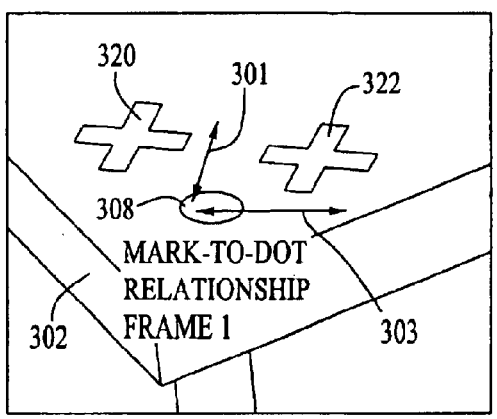
Figure 8D:
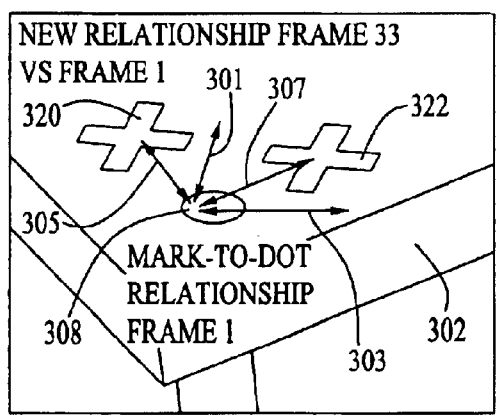
Figure 8E:
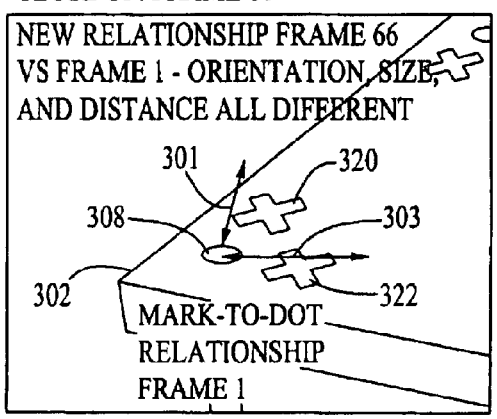
Figure 8F:
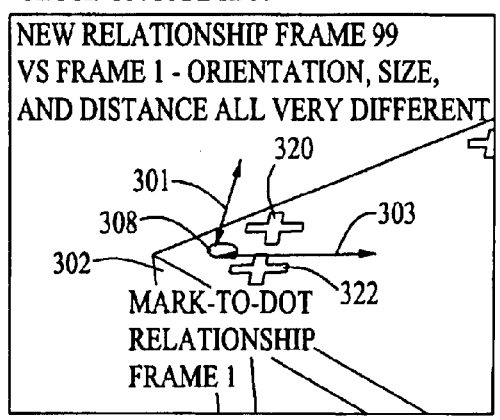

FIG. 6 illustrates a more complex camera motion problem. FIG. 6 shows table 302. Tracking marker dots 304, 306, 308, and 310 have been placed near the corners of table 302 in order to assist in determining the 3-D coordinates of the camera motion, as described above. Directed line 315 represents the complex path of the camera motion as the scene is recorded. The camera (not shown) begins recording at the end of table 302 between tracking marker dots 308 and 310. The camera then does a partial move in and around table 302, continuing to maintain its center of view on the center of the table. The camera moves around one side of the table between tracking marker dots 310 and 306 and then pulls back, always keeping the table in the camera view.

The complex camera move described in relation to FIG. 6 may result in a number of recorded frames showing table 302 from different perspectives and distances relative to the camera. FIG. 7 illustrates the complex motion of the camera (not shown) in relation to table 302 by showing four frames from the recording camera's point of view of the move in FIG. 6, selected from the number of frames at intervals of 32 frames. FIG. 7 uses selected frames taken from the recorded view which follows the path 315 in FIG. 6. FIG. 7($a$) shows the initial view of table 302 before the camera move begins, i.e., the first frame. FIG. 7($b$) shows a recorded frame number 33 as the camera moves around table 302. FIG. 7($c$) shows a recorded frame number 66 as the camera continues moving around table 302. Finally, FIG. 7($d$) shows a recorded frame number 99 after the camera has completed its move around table 302 and has pulled back.

It can be seen that the camera move illustrated by FIGS. 7($a$)–7($d$) introduces additional complexity into the replacement process because the 2-D spatial relationship between the target and the source, as well as the size of both, changes from frame-to-frame. Thus, it is more difficult to copy the pixels from desired sources consistently over the target tracking markers because the relationship between the target and source does not remain constant. This difficulty is described in more detail below in relation to FIG. 8.

FIG. 8 illustrates the complex motion of the camera (not shown) in relation to table 302 by showing close-ups of one corner of table 302 as the camera move progresses. Four frames selected at intervals of 32 frames from a number of recorded frames of the scene are shown. FIG. 8($a$) shows the initial view of one corner of table 302 before the camera move begins, i.e., the first frame. The + marks 320 and 322 indicate the areas of the table surface which are intended to form the basis for the source replacement imagery for marker dot 308. FIG. 8($b$) shows the 2-D spatial relationship in the first frame between tracking marker dots 308 and its associated replacement portions 320 and 322. Dimension 301 represents the 2-D spatial relationship between tracking marker dot 308 and replacement portion 320. Similarly, dimension 303 represents the 2-D spatial relationship between tracking marker dot 308 and replacement portion 322.

As the camera progresses through its move in 3-D space, it records table 302 from a different perspective from frame-to-frame. FIG. 8($c$) shows recorded frame number 33 as the camera moves around table 302. FIG. 8($c$) shows Dimension 301 and Dimension 303 in the same 2-D screen position as FIG. 8($b$), but because the camera has moved to the new position in this frame the 2-D Dimension lines no longer correspond to the replacement positions. FIG. 8($d$) shows how this different perspective changes the original 2-D spatial relationship between tracking marker dot 308 and replacement portions 320 and 322. Dimension 305 represents the new 2-D spatial relationship between tracking marker dot 308 and replacement portion 320. Similarly, dimension 307 represents the new 2-D spatial relationship between tracking marker dot 308 and replacement portion 322.

FIG. 8($e$) shows a recorded frame number 66 as the camera continues moving around table 302. FIG. 8($f$) shows a recorded frame number 99 after the camera has completed its move around table 302. In both FIGS. 8($e$) and 8($f$) original dimensions 301 and 303 are shown in relation to tracking marker dot 308 and replacement portions 320 and 322. It can be seen from FIGS. 8($b$)–8($f$) that as the camera performs a more complex move, the 2-D spatial relationship between tracking marker dot 308 and replacement portions 320 and 322 is constantly changing from frame-to-frame. In addition, it can be seen from FIGS. 8($b$)–8($f$) that the size and shape of tracking marker dot 308 and replacement portions 320 and 322 also changes from frame-to-frame during the camera move.

Thus, the frame-to-frame variations in the 2-D spatial relationship between the tracking markers and the replacement portions illustrated in FIGS. 8($b$)–8($f$) may make using a 2-D tracking program to perform copying and pasting of a consistent source very difficult. This is because a number of complex variables (size, distance, orientation relationships) result from the complex camera move. Furthermore, because the replacement portions used to overlay a particular tracking marker may not be consistent from frame-to-frame, negative effects such as flicker, inconsistent color change, or wobble may occur in that portion of the scene where the tracking marker was overlaid.

At this point in the standard process flow, 2-D tracking algorithms in combination with a compositing application may be used to digitally replace the portion of the image with the tracking markers with a replacement portion from a source which appears to be a part of the scene. However, as discussed above, although this standard tracking marker replacement process may be automated to a certain extent for simple camera moves like the one described in reference to FIG. 4, more complex camera moves like the one described in reference to FIG. 6 may require manual adjustment of individual pixels within individual frames. More complex camera moves may also require manual adjustment and testing to offset the original to the tracking in order to provide consistent and acceptable source image pixels. These requirements may lead to undesirable expenditures of time and computer resources.

A system and process according to embodiments of the invention provide a more automated and accurate process of removing tracking markers and other unwanted geometry than the standard process described above. While both the standard process and a system and process according to embodiments of the invention generate a 3-D map by a 3-D tracking process (as shown in step 210 in FIG. 2), the standard process may only utilize the 3-D map as an aid in the post-production process (step 218) of seamlessly integrating CGI into the live action scene, and not for the replacement process.

In contrast, in addition to using the 3-D map as an aid in the post-production process of seamlessly integrating CGI into the live action scene, a system and process according to embodiments of the invention also advantageously utilize the 3-D map to automatically and consistently derive the 2-D coordinates and size of the tracking markers and other unwanted geometry and replacement portions, as well as the 2-D distance between them, within each frame of the recorded scene, as shown in step 214. This information is then used to more completely automate the process of replacing tracking markers or other unwanted or unnecessary objects or geometry. A system and process according to embodiments of the invention will now be described.

As described above, a 3-D map may be obtained using standard manual or automatic procedures and/or tracking algorithms to convert the 2D tracking information of the recorded scene into the 3-D map. The 3-D map of the scene may comprise a set of 3-D coordinates of objects in the scene. The sets of 3-D coordinates of each frame of the recorded scene represent the actual position and size of the objects, as well as the actual distance between them in 3-D space and therefore do not change regardless of camera motion. These 3-D coordinates are independent and separate from the position and size in 2D screen space as seen by the camera which are recorded as changes on a frame by frame basis.

To illustrate the relationship between 3-D coordinates and points or features in 2-D screen space, FIG. 9 shows a scene 900 being recorded by camera 902. Tracking marker dot 906 is placed on table 904 to assist in a 3-D solve of scene 900. Replacement portion 908 has previously been determined to be a suitable replacement portion for tracking marker dot 906.

The position of both tracking marker dot 906 and replacement portion 908 within scene 900 may be defined by dimensions in 3-D space. For example, tracking marker dot 906 may have a diameter of 2 inches (represented by dimension 903) and replacement portion 908 may have sides that are 3 inches long (represented by dimension 905). Similarly, the distance between tracking marker dot 906 and replacement portion 908 may be 5 inches (represented by dimension 907). These real-world dimensions will not change when camera 902 moves as the scene is being recorded. Thus, when the recorded scene is converted into a 3-D map, the position, size, and relationship to one another in 3-D space of tracking marker dot 906 and replacement portion 908 will remain constant despite any moves of camera 902 along the camera path 901.

In contrast, in 2-D screen space, the position, size, and relationship to one another of tracking marker dot 906 and replacement portion 908 will be changing as the camera 902 moves along the path 901. The 2-D screen space change is illustrated by frames 910 and 912 in FIG. 9. Frames 910 and 912 may be displayed on a typical display screen of a computer monitor (for example, monitor 104 in FIG. 1), which might be used in the practice of this invention. The geometry of a typical display screen is shown in relation to frames 910 and 912. Each row (the "x" direction) of the screen or raster has 640 pixels and there are 480 such rows (the "y" direction). The origin (0, 0) is shown at the upper left hand corner of both frame 910 and 912.

Frame 910 represents the first frame of the recorded scene corresponding to the pre-move position of camera 902 (as shown by directed line 909). Frame 912 represents a frame of the recorded scene corresponding to the post-move position of camera 902 (as shown by directed line 911). In frames 910 and 912, the position, size, and relationship to one another of tracking marker dot 906 and replacement portion 908 may be defined in terms of pixel locations.

In frame 910 (i.e., the pre-move position of camera 902), the center of tracking marker dot 906 is located at the 2-D coordinates x=350, y=320, while the center of replacement portion 908 is located at the 2-D coordinates x=350, y=250. The size of tracking marker dot 906 and replacement portion 908, as well as the distance between them, may similarly be defined in terms of 2-D pixel locations. In frame 912 (i.e., the post-move position of camera 902), the center of tracking marker dot 906 is located at the 2-D coordinates x=305, y=130, while the center of replacement portion 908 is located at the 2-D coordinates x=305, y=200.

Thus, it can be seen that the 2-D positions of tracking marker dot 906 and replacement portion 908 on monitor 102 change from frame-to-frame, the change corresponding to the change in position of the recording camera. It can also be seen from frame 912 that the shapes and sizes of tracking marker dot 906 and replacement portion 908 have changed from those of frame 910, because the perspective of the camera 902 has changed.

A system and process according to embodiments of the invention utilize a 3-D map to convert the 3-D position, size, and relationship of tracking marker 906 and replacement portion 908 in the recorded scene into 2-D screen space pixel locations (x and y coordinates) for each frame of the recorded scene. This conversion may be done by conversion means such as, but not limited to, a plug-in software module in the 3-D animation application or by a stand alone software application residing on workstation 102 and run by processor 120. The conversion means may also comprise firmware, hardware comprising hardwired logic, or any combination thereof.

In one embodiment, the user of the 3-D graphics application may designate the 3-D coordinates for both the tracking markers and the replacement portions in the 3-D space of the 3-D map. The user of the 3-D graphics application may do so without regard to any particular frame, because the relationship is designated in 3-D space. There are no frame or time components in 3-D space, and, therefore, 3-D space is free from the artifacts of motion which occur from the camera view on a frame by frame basis.

The designation of 3-D coordinates for both the tracking markers and the replacement portions can be done, for example, with keyboard 106 and/or mouse 108 of system 100. After this initial manual source and target selection process, the 3-D graphics application may use a 3-D map of the recorded scene derived from a 3-D solve or other technique (or the manual 3-D matchmove described earlier). In some embodiments, the 3-D graphics application may have a plug-in which derives the 2D coordinates from the 3-D map and may also generate a list of the necessary 2D coordinates of the target(s) and source(s) from frame-to-frame. In an alternative embodiment a separate application reads the 3-D map and performs the conversion automatically, deriving the necessary 2-D screen space pixel locations for the target(s) and source(s) from the 3-D map.

In one embodiment, the conversion means may log and generate a list of these 2-D screen space pixel locations. An example of such a list for one of the pixels making up a tracking marker dot is shown in Table 1. The first column of Table 1 contains the frame number. The second column of Table 1 contains the pixel's "x" coordinate. The third column of Table 1 contains the pixel's "y" coordinate. The list of pixel locations may then be input into another software application, such as a compositing application, where the 2-D coordinates are used to perform automatic replacement of the tracking markers with the replacement portions.

TABLE 1

| Frame | x | y |
|---|---|---|
| 1 | 350 | 320 |
| 2 | 348 | 320 |
| 3 | 344 | 319 |
| 4 | 356 | 317 |
| 5 | 357 | 314 |
| 6 | 356 | 311 |
| 7 | 358 | 307 |
| 8 | 360 | 303 |
| 9 | 363 | 298 |
| 10 | 366 | 292 |

Table 1 is kept simple for the sake of clarity. The list may actually be more complex since the pixel locations will form either a rectangle or ellipse (which also includes squares and circles) and therefore may take different forms. For example, a rectangle would have a minimum of four coordinates defining its corners with the possibility of a fifth component indicating its rotation, depending on the needs of the compositing program. Similarly, a derivation scheme which uses an ellipse to create ovals and circles would require a center and at least two values to indicate the height and width of the ellipse or some other mathematical description usable by the compositing program.

Thus, with a system and process according to embodiments of the invention, it is no longer necessary to perform the standard additional step of using 2-D tracking algorithms and/or manual means to replace the tracking markers with the replacement portions in the recorded scene. A system and process according to embodiments of the invention uses 3-D coordinate information contained in the 3-D map of the recorded scene derived in the previous step 210 to derive 2-D screen space positions and sizes of the tracking markers (or other replacement geometry and/or objects) and replacement portions. This information may then be input into a compositing application, where the 2-D coordinates may be used to perform automatic replacement of the tracking markers with the replacement portions based upon the list generated by the plug-in or separate application.

Because 3-D coordinates of each frame of the recorded scene represent the actual position and size of objects, as well as the actual distance between them in 3-D space, independently of their position and size in 2-D screen space as well as independent of time, the process may more accurately and consistently replace tracking markers with replacement portions despite complex camera/object moves.

After the replacement process, the recorded scene may then be sent to later post-production processing, as shown in step 216. During the post-production process, the live-action images may be combined with the CGI through standard processes, as shown in step 218.

A system and process according to embodiments of the invention may digitally average the characteristics of two or more replacement portions into a composite replacement portion that may then be used to overlay the tracking marker dot. The composite replacement portion may then have unique characteristics that may not be found in either of the individual replacement portions. This may be done, for example, when it is not desirable for adjacent locations to have identical characteristics. Thus, using this process, the area of the overlaid tracking marker dot may have a different appearance than either of the replacement portions used to create it.

A system and process according to further embodiments of the invention may advantageously use 2-D coordinates derived from a 3-D map by the conversion means to alter images in the recorded scene by animating a portion of the screen. An example of a situation where animation may be desirable is where an actor or other object within a scene moves in front of the target portion of the scene. When this occurs, the replacement portion may be seen to creep across the actor's body as the actor crosses in front of the target. A system and process according to embodiments of the invention may be used to animate the replacement portion in such a way that it is wiped away as the actor's body begins to cross over the target and then similarly reappears as the actor's body moves past the target.

A system and process according to embodiments of the invention also provides the capability for the user to choose to animate any combination of source replacement imagery area(s) and the target area(s) as deemed appropriate by the user, and to perform this animation in fixed, 3-D space without regard for camera motion using the 3-D map to simplify and provide greater control and greater automation than available with 2-D processes. For instance, according to one embodiment of the invention, the user may decide that a target area requires a particular type of gleam, reflection, shine, shadow, or other visual attribute, which may be momentary within the scene or continuous throughout the scene. The system and process allows the user to animate the desired replacement imagery section(s) to move along a surface in 3-D space, which could be any shape defined by the 3-D map such as curved or flat, and outputting appropriate replacement pixel image locations and associated imagery to replace the target area. The user could shift or animate the replacement imagery location in such a way that the target imagery appears to naturally change in accordance with its surroundings as it acquires new characteristics taken from the animating source replacement imagery area(s), or animate the size or shape of the target area as it receives new replacement imagery. Performing this function using standard 2-D screen space procedures might become highly complicated, problematic, and time-consuming.

Thus, a system and process according to embodiments of the invention overcome the problems inherent in a 2-D replacement process for replacing tracking markers and other objects, as well as other unwanted geometry, as described above. By using 3-D coordinates within a 3-D map to derive pixel locations in 2-D screen space, a system and process according to embodiments of the invention allow the fixed relationships that are based on real-world measurements to be converted into continuously changing pixel coordinates.

A system and process according to embodiments of the invention may greatly reduce the amount of manual labor and time expenditure involved in a replacement process for replacing tracking markers and other unwanted geometry and objects. As a result, computer resources and skilled computer graphics artists are freed up to work in other areas of a visual effects environment. In addition, a system and process according to embodiments of the invention may reduce the amount of time that is required to complete a particular compositing project and may lower the overall cost of the project.

It is to be understood that even though numerous characteristics and advantages of embodiments of the present invention have been set forth in the foregoing description, together with details of the structure and function of embodiments of the invention, this disclosure is illustrative only. Changes may be made in detail, especially matters of structure and management of parts within the principles of the present invention to the full extent indicated by the broad general meaning of the terms in which the appended claims are expressed.

For example, in describing a system and process according to embodiments of the invention, the above-described method of choosing areas adjacent to the tracking markers as replacement portions has been described. However, the invention is not limited to this method. Thus, a system and process according to embodiments of the invention may also utilize non-adjacent areas within a frame as the replacement portions. In addition, the system and process can reference other frames other than the current frame as potential source image material to replace unwanted geometry, such as tracking markers. For instance, frames earlier or later in the sequence may be used as replacement sources, or the system and process may even use imagery from separate sources such as different scenes or captured through other means than the original recording process such as still photography or video camera, or other types of recording and scanning apparatus which can capture suitable imagery.

In addition, although a system and process according to embodiments of the invention were described in relation to a film industry visual effects environment, a system and process according to embodiments of the invention may also be employed in various other environments and applications, including, but not limited to, television special effects, video game development, educational applications, interactive applications, and computer aided design applications (for example, architectural design).

Various embodiments of the present invention may include one or more of the features and functions described above. One example embodiment includes all the features and functions described above.

Therefore, a system and process according to embodiments of the invention may accelerate and simplify the post-production process for removing tracking markers and other unwanted geometry and objects from recorded scenes. A system and process according to embodiments of the invention may also more automatically and accurately replace tracking markers and other unwanted geometry and objects with replacement portions in scenes where the 2-D spatial relationship between the tracking markers and other unwanted geometry and objects and the replacement portions, as well as the size of each, do not remain constant from frame-to-frame. A system and process according to embodiments of the invention may also digitally average the characteristics of two or more replacement portions into a composite replacement portion that may then be used to overlay a tracking marker.

In one embodiment, a software application is used to derive 2-D pixel locations from a 3-D map generated during a 3-D matchmove process. The pixel locations are then exported to a 2-D compositing program. The 2-D compositing program uses the pixel locations in order to automatically replace tracking markers and other unwanted geometry and objects with replacement portions.

Having disclosed exemplary embodiments and the best mode, modifications and variations may be made to the disclosed embodiments while remaining within the scope of the invention as defined by the following claims.

What is claimed is:

1. A process for altering images in frames of a recorded scene, the recorded scene comprising a plurality of frames, the process comprising:

converting at least one 2-D point or feature within a first frame to a set of 3-D coordinates;

designating at least one set of 3-D coordinates within the first frame as a target point;

logging 3-D variations in the recorded scene from the first frame to a second frame;

outputting a plurality of sets of 3-D coordinates corresponding to the 3-D variations in the recorded scene;

converting the outputted plurality of sets of 3-D coordinates into a first plurality of 2-D points or features corresponding to 2-D variations in the target point from the first frame to the second frame; and inputting the first plurality of 2-D points or features into a compositing application;

wherein the compositing application automatically locates and alters the target point in the first and second frames using the first plurality of 2-D points or features.

2. The process recited in claim 1, wherein designating at least one set of 3-D coordinates within the first frame as a target point comprises manually designating the at least one set of 3-D coordinates with an input device.

3. The process recited in claim 1, wherein logging 3-D variations in the recorded scene from the first frame to a second frame comprises generating a list of the 3-D variations.

4. The process recited in claim 1, wherein outputting a first plurality of sets of 3-D coordinates comprises outputting the plurality of sets of 3-D coordinates to a conversion means.

5. The process recited in claim 1, wherein converting the outputted plurality of sets of 3-D coordinates into a first plurality of 2-D points or features comprises using conversion algorithms to convert the plurality of outputted sets of 3-D coordinates into a first plurality of 2-D points or features.

6. The process recited in claim 5, further comprising generating a list of the first plurality of 2-D points or features.

7. The process recited in claim 1, further comprising:

designating at least one set of 3-D coordinates within the first frame as a source point;

converting the outputted plurality of sets of 3-D coordinates into a second plurality of 2-D points or features corresponding to 2-D variations in the source point from the first frame to the second frame; and inputting the second plurality of 2-D points or features into a compositing application;

wherein the compositing application automatically locates and copies the source point in the first and second frames to the target point in the first and second frames using the first and second plurality of 2-D points or features.

8. The process recited in claim 7, wherein designating at least one set of 3-D coordinates within the first frame as a source point comprises manually designating the at least one set of 3-D coordinates with an input device.

9. The process recited in claim 7, wherein converting the outputted plurality of sets of 3-D coordinates into a second plurality of 2-D points or features comprises using conversion algorithms to convert the plurality of outputted sets of 3-D coordinates into a second plurality of 2-D points or features.

10. The process recited in claim 9, further comprising generating a list of the second plurality of 2-D points or features.

11. The process recited in claim 7, wherein designating at least one set of 3-D coordinates within the first frame as a source point comprises designating two or more sets of 3-D coordinates within the first frame as source points.

12. A system for altering images in frames of a recorded scene, the recorded scene comprising a plurality of frames, the system comprising:

a processing device suitable for performing media production editing, compositing and mixing of the images in the recorded scene;

a display screen connected with the processing device for displaying the recorded scene;

a 3-D graphics software application executable by the processing device and suitable for generating a 3-D map of the recorded scene;

a conversion means for converting 3-D coordinates within the 3-D map to 2-D pixel coordinates on the display screen; and a compositing software application executable by the processing device and suitable for locating and altering a target point in a frame of the recorded scene;

wherein the conversion means outputs the 2-D pixel coordinates to the compositing software and wherein the compositing software alters the target point using the 2-D pixel coordinates.

13. The system recited in claim 12, wherein the conversion means comprises a software plug-in associated with a 3-D animation software application.

14. The system recited in claim 12, wherein the conversion means comprises a stand-alone software application.

15. The system recited in claim 12, wherein the conversion means comprises at least one of firmware and hardware comprising hardwired logic.

16. The system recited in claim 12, wherein the processing device comprises a computer graphics workstation.

17. A process for making a recording of a scene, comprising:

designating a point or feature to be tracked within a scene;

recording the scene;

importing the recorded scene into a 3-D graphics application;

tracking the designated point or feature within the scene in 2-D screen space;

converting at least one 2-D point or feature within a first frame of the recorded scene to a set of 3-D coordinates;

designating at least one set of 3-D coordinates within the first frame as a target point;

logging 3-D variations in the recorded scene from the first frame to a second frame;

outputting a plurality of sets of 3-D coordinates corresponding to the 3-D variations in the recorded scene;

converting the outputted plurality of sets of 3-D coordinates into a first plurality of 2-D points or features corresponding to 2-D variations in the target point from the first frame to the second frame; and inputting the first plurality of 2-D points or features into a compositing application;

wherein the compositing application automatically locates and alters the target point in the first and second frames using the first plurality of 2-D points or features.

18. The process recited in claim 17, further comprising:

designating at least one set of 3-D coordinates within the first frame as a source point;

converting the outputted plurality of sets of 3-D coordinates into a second plurality of 2-D points or features corresponding to 2-D variations in the source point from the first frame to the second frame; and inputting the second plurality of 2-D points or features into a compositing application;

wherein the compositing application automatically locates and copies the source point in the first and second frames to the target point in the first and second frames using the first and second plurality of 2-D points or features.

19. The process recited in claim 18, wherein designating at least one set of 3-D coordinates within the first frame as a source point comprises designating two or more sets of 3-D coordinates within the first frame as source points.

20. The process recited in claim 17, wherein importing the recorded scene into a 3-D graphics application comprises scanning the recorded scene into the 3-D graphics application.

* * * * *